(12) United States Patent
Trumbore et al.

(10) Patent No.: US 7,951,240 B2
(45) Date of Patent: May 31, 2011

(54) PROCESS OF PRODUCING ROOFING SHINGLE COATING ASPHALT ALLOWING MORE MATERIAL OPTIONS

(75) Inventors: David C. Trumbore, Chicago, IL (US); Edward R. Harrington, Toledo, OH (US); Jason D. Guerra, Tinley Park, IL (US); Donn R. Vermilion, Newark, OH (US); David R. Jones, IV, Brixey, MO (US); Sue Ann Jones, legal representative, Brixey, MO (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 693 days.

(21) Appl. No.: 12/002,681

(22) Filed: Dec. 18, 2007

(65) Prior Publication Data

US 2009/0004387 A1 Jan. 1, 2009

Related U.S. Application Data

(63) Continuation-in-part of application No. 11/823,634, filed on Jun. 28, 2007.

(51) Int. Cl.
*C08L 95/00* (2006.01)
(52) U.S. Cl. ............... 106/273.1; 106/270; 106/285
(58) Field of Classification Search ........... 106/270, 106/273.1, 285; 208/39, 44
See application file for complete search history.

(56) References Cited

U.S. PATENT DOCUMENTS

| | | | |
|---|---|---|---|
| 1,782,186 A | 11/1930 | Abson | |
| 2,179,208 A | 11/1939 | Burk et al. | |
| 2,200,914 A | 5/1940 | Burk et al. | |
| 2,375,117 A | 5/1945 | Lentz | |
| 2,450,756 A | 10/1948 | Hoiberg | |
| 2,649,384 A | 8/1953 | Anderson | |
| 2,762,755 A | 9/1956 | Kinnaird | |
| 3,126,329 A | 3/1964 | Fort | |
| 3,703,393 A | 11/1972 | Koons | |
| 4,328,147 A | 5/1982 | Chang et al. | |
| 4,338,137 A | 7/1982 | Goodrich | |
| 4,382,989 A | 5/1983 | Chang et al. | |
| 4,456,523 A * | 6/1984 | Carlos et al. ............ 208/5 |
| 4,497,921 A | 2/1985 | Chang | |
| 4,544,411 A | 10/1985 | Wobles et al. | |
| 4,554,023 A | 11/1985 | Janicki | |
| 4,584,023 A | 4/1986 | Goodrich | |
| 4,659,389 A | 4/1987 | Wombles et al. | |
| 4,711,672 A | 12/1987 | Gorter et al. | |
| 4,780,146 A | 10/1988 | Chang | |
| 4,882,373 A | 11/1989 | Moran | |
| 4,885,210 A | 12/1989 | Vedove | |
| 5,059,300 A | 10/1991 | McGinnis | |
| 5,098,480 A | 3/1992 | McGinnis et al. | |
| 5,330,569 A | 7/1994 | McGinnis et al. | |
| 5,333,439 A | 8/1994 | Bozich et al. | |
| 5,393,811 A | 2/1995 | Moran et al. | |
| 6,060,550 A | 5/2000 | Simon et al. | |
| 6,120,913 A | 9/2000 | Kluttz et al. | |
| 6,258,255 B1 | 7/2001 | Gale et al. | |
| 6,414,056 B1 | 7/2002 | Puzic et al. | |
| 6,451,394 B1 | 9/2002 | Marzari et al. | |
| 6,588,974 B2 | 7/2003 | Hildebrand et al. | |
| 6,852,806 B2 | 2/2005 | Sasagawa et al. | |
| 6,913,416 B2 | 7/2005 | Hildebrand et al. | |
| 7,317,045 B2 | 1/2008 | Zanchetta et al. | |
| 7,371,805 B2 | 5/2008 | Sasagawa et al. | |
| 7,696,267 B2 | 4/2010 | Sasagawa et al. | |
| 2005/0107521 A1 | 5/2005 | Sasagawa et al. | |
| 2005/0234193 A1 | 10/2005 | Sasagawa et al. | |
| 2007/0054987 A1 | 3/2007 | Zanchetta et al. | |
| 2007/0054988 A1 | 3/2007 | Zanchetta et al. | |
| 2007/0131578 A1 | 6/2007 | Ruan et al. | |

FOREIGN PATENT DOCUMENTS

| | | |
|---|---|---|
| CA | 1 260 653 | 9/1989 |
| EP | 0 911 377 | 4/1999 |
| GB | 1084486 | 9/1967 |

OTHER PUBLICATIONS

Trumbore, David et al., Emission Factors for Asphalt-Related Emissions in Roofing Manufacturing, Environmental Progress, Oct. 2005, 268-278, vol. 24, No. 3.
International Search Report dated Oct. 9, 2008 in PCT/US2008/068455.
International Search Report dated Apr. 22, 2009 in PCT/US2008/087464.
Office Action issued in U.S. Appl. No. 12/002,648, filed Dec. 18, 2007, mailing date Apr. 5, 2010.
Office Action issued in U.S. Appl. No. 11/823,634, filed Jun. 28, 2007, mailing date Aug. 12, 2010.

* cited by examiner

*Primary Examiner* — Walter D Griffin
*Assistant Examiner* — Brian McCaig
(74) *Attorney, Agent, or Firm* — MacMillan, Sobanski & Todd, LLC

(57) ABSTRACT

In a process of producing a roofing shingle coating asphalt from a low flashpoint asphalt feedstock, an asphalt feedstock which has a low flashpoint of from 490° F. (254° C.) to 540° F. (282° C.) is partially blown, and wax is added to the asphalt feedstock. The process produces a coating asphalt having a low melt viscosity of from 50 cps to 150 cps at 400° F. (204° C.), a softening point of from 190° F. (88° C.) to 235° F. (113° C.) and a penetration of at least 15 dmm at 77° F. (25° C.). In another embodiment, the process produces a roofing shingle coating asphalt having good weatherability from a poor weathering asphalt feedstock. In a further embodiment, the process produces roofing shingles including a filled coating containing a poor tear filler without sacrificing the tear strength of the shingles.

23 Claims, No Drawings

US 7,951,240 B2

PROCESS OF PRODUCING ROOFING SHINGLE COATING ASPHALT ALLOWING MORE MATERIAL OPTIONS

TECHNICAL FIELD AND INDUSTRIAL APPLICABILITY OF THE INVENTION

This invention relates in general to processes of producing asphalt roofing products, and in particular to a process of producing roofing shingle coating asphalt and roofing shingles.

BACKGROUND OF THE INVENTION

Roofing shingle coating asphalts are usually produced by selecting a suitable feedstock asphalt and then processing that asphalt by air blowing to provide the properties desired for use in a coating asphalt. For example, asphalt feedstocks used to produce coating asphalts for roofing shingles are usually chosen so that they can be air-blown to: 1) raise their softening point so that they maintain their dimensions at high temperatures on a roof; 2) lower their penetration into a range where it allows proper press of granules without becoming too brittle; 3) raise their melt viscosity so that when filler is added the filled coating viscosity is in a range that allows a roofing shingle process to run at high speeds; and 4) create a shingle that will perform over many years on the roof in spite of being exposed to sun, high temperatures and rain.

Historically coating asphalt for roofing shingles has been produced by choosing a special grade of asphalt as the feedstock to the air blowing process in order to meet these properties. These special grades of asphalt were often materials that were softer (higher penetration, lower viscosity) than paving grade asphalt and were often called "roofer's flux". In addition to being softer they needed to have high flash points to allow the final coating to be heated to high temperatures in preparation for mixing with filler and coating a glass fiber mat, and they needed to have the characteristics that once air blown to coating they exhibited excellent durability to weather. Unfortunately, these special grades of asphalt that can be air-blown to make coating asphalts are increasingly in short supply and therefore can be costly compared to many other types of asphalt, particularly commodity paving asphalts. A new process that increases material opportunities in the production of roofing shingle coating asphalt would be beneficial to the asphalt roofing product business.

BACKGROUND ART

Asphalts have been modified with waxes to produce a variety of roofing and industrial products. For example, Chang et al. (U.S. Pat. No. 4,382,989) discloses a roofing asphalt formulation containing oxidized coating grade asphalt, oxidized polyethylene and optionally saturant asphalt and filler. In one embodiment, the asphalt is oxidized to any degree, then unoxidized polyethylene is added, and then the oxidation process is continued to produce the roofing asphalt formulation. In a later improvement Chang et al. (U.S. Pat. No. 4,497,921) added sulfur to stabilize the mix. Janicki (U.S. Pat. No. 4,554,023) claimed a method of making a roofing shingle asphalt by blending bis-stearoylamide wax into asphalt, including blown asphalt, particularly asphalts with 143° F. softening points, with a benefit of lowering the viscosity of the asphalt product.

SUMMARY OF THE INVENTION

The invention relates to a process of producing a roofing shingle coating asphalt from a low flashpoint asphalt feedstock. An asphalt feedstock which has a low flashpoint within a range of from about 490° F. (254° C.) to about 540° F. (282° C.) is partially blown. Wax is added to the asphalt feedstock. The process produces a coating asphalt having a low melt viscosity within a range of from about 50 cps to about 150 cps at 400° F. (204° C.), a softening point within a range of from about 190° F. (88° C.) to about 235° F. (113° C.) and a penetration of at least about 15 dmm at 77° F. (25° C.).

In another embodiment, the invention relates to a process of producing a roofing shingle coating asphalt from a poor weathering asphalt feedstock. The poor weathering asphalt feedstock is partially blown. Wax is added to the asphalt feedstock. The process produces a coating asphalt having good weatherability as measured by a durability of at least 60 cycles to failure in the accelerated weathering test described in ASTM D4798, and having a softening point within a range of from about 190° F. (88° C.) to about 235° F. (113° C.) and a penetration of at least about 15 dmm at 77° F. (25° C.).

In a further embodiment, the invention relates to a process of producing roofing shingles using a poor tear filler. A roofing shingle coating asphalt is produced by a process in which an asphalt feedstock is partially or fully blown and wax is added to the asphalt feedstock. The coating asphalt has a softening point within a range of from about 190° F. (88° C.) to about 235° F. (113° C.) and a penetration of at least about 15 dmm at 77° F. (25° C.). A poor tear filler is mixed with the coating asphalt to produce a filled coating. The filled coating is applied to a fibrous roofing mat to produce a coated mat. The coated mat is cut into roofing shingles. The roofing shingles have an MD tear resistance of at least about 1000 grams and a CD tear resistance of at least about 1950 grams as measured according to ASTM D1922.

Various aspects of the invention will become apparent to those skilled in the art from the following detailed description of the preferred embodiments.

DETAILED DESCRIPTION AND PREFERRED EMBODIMENTS OF THE INVENTION

The invention relates to a process of producing a roofing shingle coating asphalt from an asphalt feedstock. As described in more detail below, the process advantageously allows more material options in the production of the coating asphalt.

The term "asphalt" is meant to include asphalts produced from petroleum refining, including residua from atmospheric distillation, from vacuum distillation, and from solvent deasphalting units. Mixtures of different asphalts can also be used. The invention can also be used with natural bitumen like the products extracted from the oil sands in Alberta or asphalts derived from oil sands by various refinery processes.

The asphalt feedstock for use in the process can be any suitable type of asphalt, including a non-coating grade asphalt such as a paving asphalt, a coating asphalt, an asphalt modified with a polymer, wax, solvent or other suitable material, or any suitable mixture of different asphalts. As described below, the asphalt feedstock can be a low flashpoint asphalt or a low weathering grade asphalt.

By "non-coating grade asphalt", as used herein, is meant an asphalt that cannot be air blown to the ASTM softening point and penetration specifications for a coating asphalt, or which has too low a flashpoint to be used in normal air blowing processes or in the roofing shingle manufacturing process, or which when blown meets those specifications but has poor durability. For example, the non-coating grade asphalt can be a paving grade asphalt or a mixture of different paving grade asphalts. Paving asphalts typically are harder (lower penetration) and higher in softening point and viscosity than the asphalts typically used as feedstock to the air blowing process to make shingle coating asphalt. Poor durability feedstock asphalts are often quite soft and low in viscosity. Typical of paving asphalts are the straight run asphalts derived from the atmospheric and vacuum distillation of crude oils, or are made by blending vacuum tower residua with residua from solvent deasphalting units.

Any suitable paving asphalt(s) can be used, for example paving asphalts which meet the PG64-22 specifications (AASHTO M320). Paving asphalts were previously graded by viscosity and a common asphalt that is similar to the PG64-22 grade and usable in this process is the old AC20 grade (ASTM D3381). Some other examples of paving asphalts that may be suitable include PG67-22, PG-70-22, PG58-22, PG70-16, PG70-10, PG67-10, pen grade 40-50, pen grade 60-70, pen grade 85-100, pen grade 120-150, AR4000, AR8000, and AC30 grade.

A polymer modified asphalt for use as the asphalt feedstock can be made from any suitable asphalt and any suitable polymer, or any suitable mixtures of different asphalts and/or different polymers. In some embodiments the polymers are elastomeric polymers, which are natural or synthetic rubbers and include butyl, polybutadiene, polyisoprene or polyisobutene rubber, styrene/butadiene copolymer such as styrene/butadiene/styrene triblock copolymer (SBS), styrene/ethylene-butylene/styrene triblock copolymer (SEBS), styrene/isoprene copolymer, epoxy modified acrylate copolymer (e.g., Elvaloy®), ethylene/vinyl acetate copolymer (EVA), ethylene/propylene/diene terpolymer (EPDM), polyacrylate, polymethacrylate and polychloroprene.

In a particular embodiment the polymer modified asphalt is a paving grade asphalt that has been modified with an elastomeric polymer. Some examples include SBS-modified paving asphalts such as PG76-22, PG70-28, PG76-28, etc.

In a first embodiment of the present process, the process allows the use of a low flashpoint asphalt feedstock to produce a coating asphalt. By way of background, in a conventional process for producing roofing shingles, a fibrous mat is fed through a coating pan which contains molten coating asphalt mixed with filler. The coating asphalt is heated to a high enough temperature to lower the filled coating viscosity sufficiently for effective coating of the mat. Ordinarily, a coating asphalt having a relatively high flashpoint is used so that it can be heated to a relatively high temperature without risk of fire or explosion. An asphalt feedstock having a relatively high flashpoint is used to produce the high flashpoint coating asphalt.

In contrast with the conventional process, the present process allows the use of a low flashpoint asphalt feedstock to produce a low flashpoint coating asphalt, because the process also produces a coating asphalt having a relatively low melt viscosity compared to typical coating asphalts. In particular, the coating asphalt has a low melt viscosity within a range of from about 50 cps to about 150 cps at 400° F. (204° C.), and more particularly within a range of from about 75 cps to about 125 cps. The low melt viscosity allows the filled coating asphalt to be heated to a lower temperature in the coating pan while still achieving a viscosity low enough for effective coating of the mat.

The present process also allows the use of a low flashpoint asphalt feedstock because, as described below, the blowing process is not so extensive and it may be run at lower temperatures (safely below the flashpoint).

The asphalt feedstock has a low flashpoint within a range of from about 490° F. (254° C.) to about 540° F. (282° C.), and more particularly within a range of from about 500° F. (260° C.) to about 530° F. (277° C.). Any suitable low flashpoint asphalt feedstock, or a mixture of different asphalt feedstocks, can be used to produce the coating asphalt. Some nonlimiting examples are Canadian asphalts and California based asphalts. The ability to use a low flashpoint asphalt feedstock can be an advantage in terms of cost and/or availability compared to the use of high flashpoint asphalt feedstocks.

In the first embodiment of the process, the low flashpoint asphalt feedstock is subjected to a partial blowing process. The blowing process is an oxidizing process that comprises blowing an oxygen-containing gas (for example, air, oxygen or an oxygen-inert gas mixture) through the asphalt in a converter at an elevated temperature. Several catalysts are suitable for use in the blowing process.

By partial blowing, as used herein, is meant any amount of blowing that raises the softening point of the asphalt feedstock to an intermediate softening point that is lower than a target range for the coating asphalt of from about 190° F. (88° C.) to about 235° F. (113° C.). Whereas a conventional blowing process involves fully blowing the asphalt until it reaches a softening point within the target range, the partial blowing process stops blowing the asphalt before the softening point has reached this target range.

As described below, the process also includes adding wax to the asphalt feedstock at any time relative to the partial blowing process (i.e., before, during and/or after the process). The wax addition may raise the softening point of the asphalt feedstock to within the target range. Thus, the partial blowing is defined as a blowing process that raises the softening point to an intermediate softening point below the target range in the absence of the wax addition.

The intermediate softening point resulting from the partial blowing can be any softening point greater than the original softening point of the asphalt feedstock and lower than the target range for the coating asphalt. For example, the intermediate softening point may be within a range of from about 140° F. (60° C.) to about 185° F. (85° C.). Limiting the blowing process helps to produce a coating asphalt having a low melt viscosity. It also reduces energy consumption and may reduce emissions. In one embodiment, the partial blowing is limited so that the asphalt feedstock at the end of the partial blowing and before wax addition has a softening point of less than about 175° F. (79° C.).

Optionally, the partial blowing process can be conducted at a lower temperature than a typical blowing process. For example, the partial blowing may be conducted at a temperature not greater than about 480° F. (249° C.), or more particularly not greater than about 470° F. (243° C.).

In one embodiment, the partial blowing lowers the penetration of the asphalt feedstock to an penetration that is within or close to a target penetration range of the coating asphalt. For example, if the target penetration range is from about 15 dmm to about 28 dmm at 77° F. (25° C.), "within or close to" the target range may be a range of from about 13 dmm to about 30 dmm. The penetration can be adjusted in different ways for production of the final coating asphalt; for example, the wax addition can affect the penetration.

Any type of wax, or a mixture of different waxes, can be added to the asphalt feedstock at any time relative to the partial blowing process. In one embodiment, the wax has a high congealing point or a high drop melt point of at least about 75° C., specifically at least about 90° C., and more specifically at least about 100° C. The term "melt point" as used herein refers broadly to either the congealing point or the drop melt point of the wax, which are defined by ASTM D 938 in the case of congealing point and ASTM D 3954 in the case of drop melt point. Also wax can be characterized by penetration or hardness (ASTM D5 or ASTM D 1321), density (ASTM D1505), viscosity (ASTM D 4402 or ASTM D88), or acid value (ASTM D 1386).

The wax can be a functionalized or synthetic wax or a naturally occurring wax. The wax can be oxidized or non-oxidized. Some examples of synthetic waxes that may be suitable include ethylene bis-stearamide wax (EBS), Fischer-Tropsch wax (FT), oxidized Fischer-Tropsch wax (FTO), polyolefin waxes such as polyethylene wax (PE), oxidized polyethylene wax (PEO), polypropylene wax, polypropylene/polyethylene wax, alcohol wax, silicone wax, petroleum waxes such as microcrystalline wax or paraffin, chlorinated wax or paraffin, and other synthetic waxes. Optionally, an EBS wax can be produced in the asphalt by in situ addition of stearic acid and amine. Any suitable order and timing of addition of the stearic acid and the amine can be used. For example, the acid can be added during the process and then a high molecular weight amine can be added at the end of the process to produce the wax. Some examples of functionalized waxes include amine waxes, amide waxes, ester waxes, carboxylic acid waxes, and microcrystalline waxes.

The naturally occurring wax can be derived from a plant, animal or mineral. Some examples of natural waxes that may be suitable include plant waxes such as candelilla wax, carnauba wax, rice wax, Japan wax and jojoba oil; animal waxes such as beeswax, lanolin and whale wax; and mineral waxes such as montan wax, ozokerite and ceresin.

The wax can be added in any suitable amount. For example, it may be added in an amount within a range of from about 0.5% to about 8% by total weight of the wax and the asphalt, and typically from about 1% to about 4%.

The addition of the wax to the partially blown asphalt may result in its softening point being increased to within the target softening point range. Alternatively, the softening point may be increased by any other suitable means. The wax addition may affect the penetration in different ways depending on the particular wax and asphalt, either increasing, decreasing, or leaving the penetration substantially unchanged. Also, the wax addition may increase, decrease, or leave the melt viscosity of the asphalt substantially unchanged, depending on the particular wax and asphalt. In one embodiment, the wax addition modifies the melt viscosity by a smaller amount than would continuing the blowing process.

Optionally, any suitable blowing catalyst(s) can be added to the asphalt feedstock before or during the partial blowing process. Some examples include phosphoric acid, ferric chloride, phosphorus pentoxide, aluminum chloride, hydrohalic acid, and boric acid. The phosphoric acid can be provided in any suitable form(s), for example, phosphoric acid, polyphosphoric acid, superphosphoric acid, orthophosphoric acid, pyrophosphoric acid, triphosphoric acid and green phosphoric acid. Green phosphoric acid is prepared by adding sulfuric acid to phosphate ore to make crude phosphoric acid, and usually contains from about 50% to about 95% phosphoric acid by weight and the remainder sulfuric acid and other materials.

The catalyst can be added in any suitable amount. In one aspect of the present process, the amount of catalyst may be limited to allow the production of a coating asphalt having a low melt viscosity. For example, in one embodiment phosphoric acid is added in an amount within a range of from about 0.1% to about 3% of active phosphoric acid weight by total weight of the phosphoric acid and asphalt, and more particularly from about 0.4% to about 1.5%.

Optionally, a polymer can be added to the asphalt at any time during the process. Any suitable polymer or mixture of different polymers can be used. Some examples include polyethylene, polypropylene, styrene/butadiene/styrene triblock copolymer, styrene/ethylene-butylene/styrene triblock copolymer, epoxy modified acrylate copolymer, ethylene/vinyl acetate copolymer, etc.

The process produces a coating asphalt suitable for coating asphalt roofing shingles. The coating asphalt has a softening point within a range of from about 190° F. (88° C.) to about 235° F. (113° C.) and a penetration of at least about 15 dmm at 77° F. (25° C.). The softening point and penetration minimums are approximately as defined by ASTM D 3462 for asphalt roofing shingles.

In one embodiment, the coating asphalt meets one or more of the tighter specifications typically used by shingle manufacturers. There are a range of different manufacturer specifications. Some examples include a softening point of from about 200° F. (93° C.) to about 215° F. (102° C.), or from about 212° F. (100° C.) to about 220° F. (104° C.); a penetration at 77° F. (25° C.) of from about 16 dmm to about 24 dmm or 28 dmm; a melt viscosity at 400° F. (204° C.) of about from about 130 cps to about 420 cps, or from about 150 cps to about 400 cps; and a weatherability (durability) of greater than about 60 cycles in the weatherometer. In addition manufacturers often specify other properties like stain index, for example a stain index less than about 10, as well as other tests that characterize rheology or durability.

The properties of the asphalt can be measured by any suitable tests, for example, as follow: softening point by ASTM D36; penetration by ASTM D5 run at 77° F. (25° C.); melt viscosity ASTM D4402 run at 400° F. (204° C.) with a Model LV Brookfield Viscometer, no. 18 spindle, 6 RPM or a Model RV Brookfield Viscometer, no. 21 spindle, 50 RPM; durability or weatherability by ASTM D4798; flashpoint by ASTM D92; stain index by ASTM D2746; and stability by ASTM D3791 modified to run at oven temperature of 500° F. (260° C.) for up to 5 days or similar test procedure.

Example 1

A Canadian asphalt having a low flashpoint of 500° F. (260° C.) is used as the asphalt feedstock. The asphalt feedstock is partially blown at 460° F. (238° C.) blowing temperature with 0.75% active phosphoric acid to raise its softening point to 162° F. (72° C.). A Fischer-Tropsch wax in the amount of 3% is added to the partially blown asphalt to further raise its softening point. The resulting coating asphalt has a low flashpoint of 505° F. (263° C.), a low melt viscosity of 133 cps at 400° F. (204° C.), a softening point of 199° F. (93° C.) and a penetration of 18 dmm at 77° F. (25° C.).

In a second embodiment of the present process, the process allows the use of a poor weathering asphalt feedstock to produce a coating asphalt that has good weatherability (durability). Weatherability is the ability of the asphalt to resist degradation due to the weather (sun, rain, wind, etc.), and increased weatherability increases the useful life of roofing shingles made with the asphalt. The weatherability can be measured by any suitable method, for example, by the accelerated weathering test described in ASTM D4798.

As used herein, the coating asphalt having good weatherability means a durability of at least 60 cycles to failure in the weatherometer using this test, and in a particular embodiment at least about 70 cycles. The poor weathering asphalt feedstock means an asphalt having characteristics such that if it was subjected to a full blowing process, instead of the partial blowing process of the invention, it would produce a coating asphalt having poor weatherability (a durability of fewer than 60 cycles to failure in the weatherometer, or more particularly fewer than about 50 cycles).

Any suitable poor weathering asphalt feedstock, or a mixture of different asphalt feedstocks, can be used to produce the coating asphalt, for example, some fluxes derived from blending with oil sand bitumen or syncrudes from oil sands. The ability to use a poor weathering asphalt feedstock can be an advantage in terms of cost and/or availability.

Optionally, a second asphalt can be blended with the asphalt feedstock before the partial blowing. Any suitable asphalt or a blend of different asphalts can be used as the second asphalt. In one embodiment, if the asphalt feedstock is too soft for the process it can be blended with a harder asphalt so that the asphalt blend has sufficient hardness. For example, the second asphalt can be the bottoms of a propane deasphalting process or other harder asphalt. In a particular embodiment, the second asphalt by itself does not enhance the weatherability of the coating asphalt.

The poor weathering asphalt feedstock, either by itself or blended with the second asphalt, is subjected to a partial blowing process as described above. A wax is added to the asphalt at any time relative to the partial blowing process. The wax can be any of those described above or others. Optionally, any suitable blowing catalyst(s) can be added to the asphalt feedstock before or during the partial blowing process. Also optionally, any suitable polymer(s) can be added to the asphalt at any time during the process.

The process produces a coating asphalt having good weatherability. The coating asphalt which has been partially blown and wax added has improved weatherability compared to the same asphalt which has been completely blown to the desired softening point without the wax addition. The coating asphalt has a softening point within a range of from about 190° F. (88° C.) to about 235° F. (113° C.) and a penetration of at least about 15 dmm at 77° F. (25° C.). In some embodiments, the coating asphalt meets one or more of the tighter manufacturer specifications, which may include a flashpoint of greater than about 550° F. (288° C.).

Example 2

A Canadian asphalt, which under normal air blowing processing produces a coating asphalt having a durability of 42 cycles to failure in the weatherometer, is used as the asphalt feedstock. It is blended with 25% of a resid from propane deasphalting which would not improve weathering under normal processing. The blended feedstock is partially blown with 0.5% active phosphoric acid to raise its softening point to 181° F. (83° C.). A Fischer-Tropsch wax in the amount of 2% and an oxidized polyethylene wax in the amount of 1% are added to the partially blown asphalt to further raise its softening point. The resulting coating asphalt has a softening point of 220° F. (97° C.), a penetration of 20 dmm at 77° F. (25° C.), and a durability exceeding 90 cycles to failure in the weatherometer—or more than double the original material durability.

In a third embodiment of the present process, the process allows the production of a filled coating using a poor tear filler while retaining desirable tear strength in roofing shingles made with the filled coating. By way of background, the coating material for roofing shingles usually includes a coating asphalt mixed with a filler of finely ground inorganic particulate matter, such as ground limestone, dolomite, silica, slate dust, or other minerals. The filler is usually included in an amount within a range of from about 30% to about 80% by total weight of the filled coating.

It has been discovered that the use of some types of filler, referred to herein as poor tear fillers, may decrease the tear strength of roofing shingles made with the filled coating. As used herein, a poor tear filler means any type of filler that produces roofing shingles that do not have a suitable tear strength as described below, where the same roofing shingles made with a ground limestone filler would have the suitable tear strength. This can be any filler or mixture of different fillers resulting in poor tear strength. In one embodiment, the poor tear filler comprises rock dust other than ground limestone, dolomite, high magnesium carbonate, or any combination thereof.

However, the present process allows the production of a filled coating using a poor tear filler without sacrificing the tear strength of the roofing shingles. While not limited to theory, it is hypothesized that the wax in the coating asphalt protects the roofing mat or its binder from abrasion caused by the poor tear filler. The ability to use a poor tear filler can be an advantage in terms of cost and/or availability compared to the use of a ground limestone filler.

In this embodiment of the process, a roofing shingle coating asphalt is produced by a process in which an asphalt feedstock is subjected to a partial blowing process to an intermediate softening point as described above, or subjected to a full blowing process to a target softening point. A wax is added to the asphalt feedstock at any time relative to the blowing process. The wax can be any of those described above or others. Optionally, any suitable blowing catalyst(s) can be added to the asphalt feedstock before or during the blowing process, and any suitable polymer(s) can be added to the asphalt at any time during the process.

The coating asphalt produced by the process has a softening point within a range of from about 190° F. (88° C.) to about 235° F. (113° C.) and a penetration of at least about 15 dmm at 77° F. (25° C.). In some embodiments, the coating asphalt meets one or more of the tighter manufacturer specifications.

A poor tear filler is mixed with the coating asphalt to produce a filled coating. The filled coating is applied to a fibrous roofing mat to produce a coated mat. The roofing mat can be any type known for use in reinforcing asphalt-based roofing materials, such as a mat, web, scrim or felt of fibrous materials such as mineral fibers, synthetic fibers such as polymer fibers, cellulose fibers, rag fibers, or a mixture thereof. In a particular embodiment, the mat is a nonwoven mat of glass fibers. The roofing mat can be made with any suitable binder, such as urea formaldehyde, acrylic resin, or styrene-butadiene latex.

The filled coating can be applied to the roofing mat in any suitable manner. As discussed above, typically the roofing mat is fed through a coating pan which contains the molten filled coating. Roofing granules are then applied to a surface of the coated mat. After the coating has hardened, the coated mat is cut into individual roofing shingles.

The roofing shingles produced by the process have good tear resistance, which can be measured in any suitable manner. For example, the roofing shingles can have an MD tear resistance of at least about 1000 grams and a CD tear resistance of at least about 1950 grams as measured according to ASTM D1922.

Example 3

A PG64-22 paving asphalt from the refining of Canadian crude oils is used as the asphalt feedstock. The asphalt feedstock is partially blown with 1.5% active phosphoric acid to raise its softening point to 172° F. (78° C.). An oxidized polyethylene wax in the amount of 3% is added to the partially blown asphalt to further raise its softening point. The resulting coating asphalt has a softening point of 207° F. (97° C.) and a penetration of 17 dmm at 77° F. (25° C.). A rock dust filler, in an amount of 60 wt % filler by weight of the filled coating, is mixed with the coating asphalt to produce a filled coating. The filled coating is applied to a roofing mat, which is a nonwoven mat of glass fibers and a urea formaldehyde binder, to produce a coated mat. Roofing granules are then applied to a surface of the coated mat. After the coating has hardened, the coated mat is cut into individual roofing shingles. The roofing shingles have an MD tear resistance of 1000 grams and a CD tear resistance of 1950 grams.

In accordance with the provisions of the patent statutes, the principle and mode of operation of this process have been described in its preferred embodiments. However, it must be understood that this process may be practiced otherwise than as specifically described without departing from its spirit or scope.

What is claimed is:

1. A process of producing a roofing shingle coating asphalt from a low flashpoint asphalt feedstock comprising:
   partially blowing an asphalt feedstock which has a low flashpoint within a range of from about 490° F. (254° C.) to about 540° F. (282° C.); and
   adding wax to the asphalt feedstock;
   the process producing a coating asphalt having a low melt viscosity within a range of from about 50 cps to about 150 cps at 400° F. (204° C.), a softening point within a range of from about 190° F. (88° C.) to about 235° F. (113° C.) and a penetration of at least about 15 dmm at 77° F. (25° C.).

2. The process of claim 1 wherein the asphalt feedstock has a low flashpoint within a range of from about 510° F. (266° C.) to about 530° F. (277° C.).

3. The process of claim 1 wherein the coating asphalt has a low melt viscosity within a range of from about 75 cps to about 125 cps at 400° F. (204° C.).

4. The process of claim 1 wherein the asphalt feedstock is a Canadian asphalt and/or a California based asphalt.

5. The process of claim 1 wherein the wax is added after the partial blowing of the asphalt feedstock.

6. The process of claim 5 wherein the partial blowing is limited so that the asphalt at the end of the partial blowing and before wax addition has a softening point of less than about 175° F. (79° C.).

7. The process of claim 1 wherein the partial blowing is conducted at a temperature not greater than about 480° F. (249° C.).

8. The process of claim 1 wherein the partial blowing of the asphalt feedstock uses a phosphoric acid catalyst in an amount within a range of from about 0.1% to about 3% by total weight of the phosphoric acid and asphalt.

9. The process of claim 1 wherein the wax has a melt point of at least about 90° C.

10. A process of producing a roofing shingle coating asphalt from a poor weathering asphalt feedstock comprising:
    partially blowing the poor weathering asphalt feedstock; and
    adding wax to the asphalt feedstock;
    the process producing a coating asphalt having good weatherability as measured by a durability of at least 60 cycles to failure in the accelerated weathering test described in ASTM D4798, and having a softening point within a range of from about 190° F. (88° C.) to about 235° F. (113° C.) and a penetration of at least about 15 dmm at 77° F. (25° C.).

11. The process of claim 10 wherein the coating asphalt has a durability of at least about 70 cycles to failure in the accelerated weathering test.

12. The process of claim 10 wherein the feedstock asphalt is selected from fluxes derived from blending with oil sands bitumen or syncrudes from oil sands.

13. The process of claim 10 further comprising blending a second asphalt with the asphalt feedstock before the partial blowing, the second asphalt by itself not enhancing the weatherability of the coating asphalt.

14. The process of claim 13 wherein the second asphalt is harder than the asphalt feedstock.

15. The process of claim 10 wherein the wax is added after the partial blowing of the asphalt feedstock.

16. The process of claim 10 wherein the partial blowing of the asphalt feedstock uses a phosphoric acid catalyst in an amount within a range of from about 0.1% to about 3% by total weight of the phosphoric acid and asphalt.

17. The process of claim 10 wherein the wax has a melt point of at least about 90° C.

18. A process of producing roofing shingles using a poor tear filler comprising:
    producing a roofing shingle coating asphalt by a process in which an asphalt feedstock is partially or fully blown and wax is added to the asphalt feedstock, the coating asphalt having a softening point within a range of from about 190° F. (88° C.) to about 235° F. (113° C.) and a penetration of at least about 15 dmm at 77° F. (25° C.);
    mixing a poor tear filler with the coating asphalt to produce a filled coating;
    applying the filled coating to a fibrous roofing mat to produce a coated mat; and
    cutting the coated mat into roofing shingles;
    the roofing shingles having an MD tear resistance of at least about 1000 grams and a CD tear resistance of at least about 1950 grams as measured according to ASTM D1922.

19. The process of claim 18 wherein the roofing shingles have a CD tear resistance of at least about 2000 grams.

20. The process of claim 18 wherein the poor tear filler comprises rock dust, dolomite or high magnesium carbonate.

21. The process of claim 18 wherein the asphalt feedstock is partially blown.

22. The process of claim 21 wherein the wax is added after the partial blowing of the asphalt feedstock.

23. The process of claim 18 wherein the wax has a melt point of at least about 90° C.

* * * * *